May 8, 1934.  C. E. VAWTER  1,957,510
ELECTRICAL INDICATING INSTRUMENT
Original Filed May 21, 1928
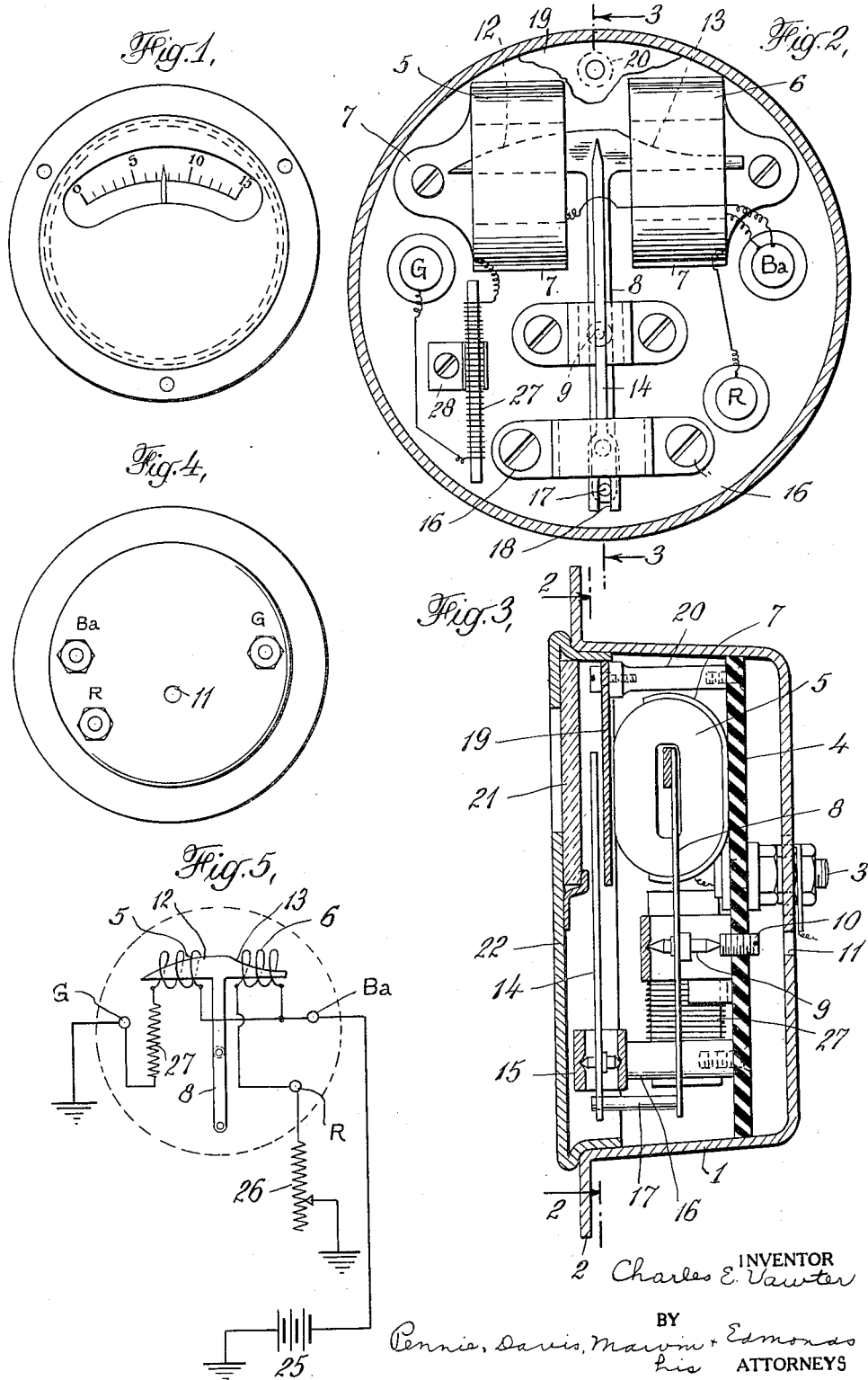

Patented May 8, 1934

1,957,510

UNITED STATES PATENT OFFICE 1,957,510

ELECTRICAL INDICATING INSTRUMENT

Charles E. Vawter, Philadelphia, Pa.; Germantown Trust Company executor of said Charles E. Vawter, deceased Application May 21, 1928, Serial No. 279,573
Renewed September 16, 1933

5 Claims. (Cl. 171—95)

This invention relates to electrical indicating instruments and has for its object to provide a cheap and reasonably accurate instrument for indicating changes in an electric circuit such as may be produced by temperature gauges, depth gauges and the like.

My improved instrument is, strictly speaking, an ohmmeter and measures changes in electric resistance as effected by the heat-sensitive element in a temperature indicating device, the movable element of a depth measuring device, or otherwise. The instrument is designed to be enclosed within a casing of a size suitable for an automobile dash instrument, and as the instrument embodies but two moving parts, the parts may be of rugged construction and easily assembled, notwithstanding the small size of the instrument.

The instrument is made throughout of stampings and screw machine parts, and may be very cheaply manufactured, particularly in large quantities.

In the accompanying drawing I have illustrated in detail the instrument as now manufactured for use as a dash depth gauge indicator for automobiles.

In said drawing

Fig. 1 is a front view of the instrument showing the dial and indicating hand about actual size;

Fig. 2 is a sectional view on the line 2—2 of Fig. 3 looking in the direction of the arrow;

Fig. 3 is a sectional view on the line 3—3 of Fig. 2, Figs. 2 and 3 being on a scale about twice actual size;

Fig. 4 is a rear view of the instrument; and

Fig. 5 is a diagrammatic view showing the circuits.

Referring to the drawing, 1 indicates the case of the instrument which comprises a shallow cup of drawn or spun metal with a flange 2 for attachment to the dash. Supported in the cup on two screws 3 which also serve as binding posts, is a disk or base 4 on which the parts of the instrument are mounted. This disk may be made of compressed fibre, bakelite or other suitable insulating material.

The instrument proper comprises two coils 5 and 6 attached to the base by means of sheet metal holders 7 of the shape shown in Figs. 2 and 3. The coils have flat or oval cross section, as shown, and working in conjunction with the coils is an oscillating armature piece 8 pivoted in an adjustable cone bearing 10 carried by the disk 4 beneath the coils. The adjustable member 10 of the bearing projects through the bottom of the disk 4 so as to be readily adjusted through a hole 11 in the casing.

The armature is T-shaped, but the two ends of the T-head are not identical. The portion 12 to the left, as shown in Fig. 2, which projects into the coil 5, contains a greater amount of metal than the portion 13 to the right, which projects into coil 6. Furthermore, the portion 12 is of a rapidly increasing cross section from its extremity toward the middle, whereas the portion 13 is of slightly increasing cross section at the outer end, the change in shape becoming more rapid toward the middle. The purpose of this difference in shape is to give an approximately uniform deflection for uniform change in resistance throughout the entire amplitude of movement of the instrument, as will be explained.

The pivoted armature member 8 may itself be used as an indicator, but in order to amplify the movement so as to permit a larger scale to be used the movement of the armature is preferably transmitted to an indicating hand 14 mounted in cone bearings 15 supported on posts 16 at each side of the lower end of the stem of the T-shaped armature piece 8. The part 8 is connected to the hand 14 by means of a pin 17 attached to the lower end of the member 8 and projecting into the slot 18 in the lower end of the hand 14. As the slotted arm of the hand 14 is short in comparison with the length of the hand, movement of the armature 8 will be considerably amplified at the index end of the hand 14.

Any desired arrangement of hand and dial may be provided. For convenience of manufacture I prefer to use a dial segment 19 supported on a post 20 set in the base 4 at its top edge between the coils 5 and 6. This dial is appropriately marked to read either in inches depth or gallons, as preferred. The dial is visible through a glass 21 fastened back of a sight opening in the front cover plate 22 of the instrument.

In Fig. 5 I have shown the electrical connections of the instrument as applied to an automobile for indicating the depth of gasoline in the tank. In this figure the battery of the car is indicated at 25. The battery is grounded on one side as customary, and the other side is connected either directly or through a switch, if desired, to one end of each of the coils 5 and 6. The coils are wound so that the magnetic forces exerted by the coils when energized oppose each other. One end of the coil 6 is connected to a variable resistance indicated at 26, which resistance is varied by the changing level of the fuel in the tank by any suitable mechanism, not shown.

The other end of the coil 5 is connected to a resistance 27 which for convenience is supported within the casing 1 of the dash instrument, as indicated in Figs. 2 and 3. This resistance has a value so proportioned to the value of the resistance 26 that the hand 14 will stand at zero on the scale when all of the resistance 26 is in circuit and will be pulled over to the other end of the scale when the portion of the resistance corresponding to a full tank of gas is in the circuit. The resistance 27 may be conveniently formed by winding a wire around a flat piece of fibre and supporting it in a clamping strap 28 attached to the face of the disk 4.

In operation the instrument is connected in circuit as in Fig. 5, through the binding posts B*a*, G, R, on the back of the casing. As the pull on the coils is in opposite directions, the armature 8 will assume a position depending upon the strength of the current through the respective coils, and also upon the relation of the amount of metal in the coil and the total amount of metal in the respective ends of the armature. That is to say, assuming that at the time the circuit is established through the instrument the tendency of the unbalanced forces is to shift the armature toward the left, as shown in Fig. 2, the armature will move in that direction, and as it does, the pull of the coil 5 will become weaker as the core is drawn into the coil and the pull of the coil 6 will become stronger as the core is pulled out of the coil. Hence a position will be reached at which the forces are equal and the hand will remain stationary. If the variable resistance is altered to lessen the resistance, for example by pouring some fuel into the tank, the current through the coil 6 will be increased, thereby disturbing the balance between the forces of the two coils and exerting a pull on the armature toward the right, as shown in Fig. 2.

As the armature moves to the right, the pull of the coil 6 becomes weaker and the pull of the coil 5 becomes stronger by reason of the shifting of the mass of metal with respect to the coils, and a new point of equilibrium will be reached with the hand stationary in the new position. By properly shaping the armature with respect to the values of the two resistances 26 and 27, and the range of adjustment of the resistance 26, a substantially equal movement of the hand may be obtained upon equal variations in the value of the resistance 26, and a uniform scale from zero to the highest desired reading may be obtained.

The instrument is little affected by the variations in voltage and for that reason is particularly adapted for use in connection with a storage battery circuit where wide variations in voltage are unavoidable. The particular instrument illustrated in the drawing gives substantially the same reading with a 6-volt battery when it is substantially discharged, and a fully charged 12-volt battery.

The system will operate on A.C. as well as D.C. current and is therefore applicable to measuring inductance, capacity or impedance.

I claim:

1. In an instrument of the class described, the combination of a pair of stationary coils having their axes in alignment, a T-shaped member having its stem extending between said coils and with its cross member extending at each end into the bore of said coils and constituting cores therefor, a pivotal support for said T-shaped member, an index hand pivoted for movement in a plane parallel with the plane of movement of said T-shaped member, and connections between said T-shaped member and said hand for effecting a multiplied angular movement of the hand.

2. In an instrument of the class described, the combination of a casing, a pair of coils supported in said casing with their axes in alignment, a T-shaped member having its cross bar forming a common core for said coils, a pivotal support for the stem of said member at a point near the middle of its length, an index hand pivotally supported at a point near the stem of said T-shaped member and overlying said stem with its free end extending to a point over said coils, a pin-and-slot connection between said stem and said index hand and a dial overlying said coils beneath said hand for indicating the movement and position of said hand.

3. In an instrument of the class described, the combination of a pair of stationary coils, a movable element lying between said coils, armature extensions on said element extending into said coils, respectively, an index hand operated by the movement of said movable element, a fixed resistance in circuit with one of said coils, a resistance to be measured in circuit with the other of said coils, means for energizing said coils from a common source, and connections between said movable element and said hand for effecting a multiplied angular movement of the hand.

4. In an instrument of the class described, the combination of a pair of stationary coils, a common core for said coils, means for supporting said core so as to extend into the bore of each of said coils, the portions of the core which extend into the respective coils being differentially shaped so that equal additions to or subtractions from the resistance in circuit with one of said coils will produce substantially equal movements of said core.

5. In an instrument of the class described, the combination of a pair of stationary coils mounted with their axes in alignment, a fixed resistance in circuit with one of said coils, a variable resistance in circuit with the other of said coils, means for energizing said circuits in parallel from a common source, a common core extending into both said coils, the portions of said core cooperating with the coils being differentially shaped with respect to each other so that equal additions to or subtractions from said variable resistance produce substantially equal movements of said core.

CHARLES E. VAWTER.